United States Patent [19]
Marino et al.

[11] Patent Number: 6,154,247
[45] Date of Patent: Nov. 28, 2000

[54] SKEW CORRECTION IN LENTICULAR MATERIAL PRINTING

[75] Inventors: Philip F. Marino; Barry D. Silverstein, both of Rochester, N.Y.

[73] Assignee: Eastman Kodak Company, Rochester, N.Y.

[21] Appl. No.: 09/223,195

[22] Filed: Dec. 30, 1998

[51] Int. Cl.[7] .................................................. B41J 27/00
[52] U.S. Cl. ........................... 347/256; 347/241; 355/33; 359/455; 359/463; 359/619
[58] Field of Search ................................... 347/257, 241, 347/256; 355/22, 33; 358/451; 359/455, 463, 619; 430/946, 228

[56] References Cited

U.S. PATENT DOCUMENTS

| | | | |
|---|---|---|---|
| 5,681,676 | 10/1997 | Telger et al. | 430/22 |
| 5,697,006 | 12/1997 | Taguchi et al. | 396/330 |
| 5,731,883 | 3/1998 | Morton et al. | 358/451 |
| 5,835,194 | 11/1998 | Morton | 355/22 |

FOREIGN PATENT DOCUMENTS

| | | |
|---|---|---|
| 0 659 026 | 6/1995 | European Pat. Off. |
| 4-043348A | 2/1992 | Japan. |
| 4-056849A | 2/1992 | Japan. |

*Primary Examiner*—N. Le
*Assistant Examiner*—Hai C. Pham
*Attorney, Agent, or Firm*—Milton S. Sales

[57] ABSTRACT

A lenticular image printer creates an image on received media having a series of lenticules with parallel axes. The printer includes a transport system adapted to move received media in an in-track direction substantially perpendicular to the axes of the lenticules. An alignment beam generator is arranged to transmit an alignment beam through the lenticules of received media such that the alignment beam is in-track position-modulated by the lenticules. Three position-sensing detectors are aligned in a cross-track direction perpendicular to the in-track direction so as to receive the position-modulated alignment beam whereby the position of the position-modulated alignment beam on the detectors provides an indication of the relative alignment of the axes of the lenticules and the cross-track direction.

12 Claims, 6 Drawing Sheets

SKEW CORRECTION IN LENTICULAR MATERIAL PRINTING

CROSS REFERENCE TO RELATED APPLICATIONS

Reference is made to commonly assigned, co-pending U.S. patent application Ser. No. 09/217,030 entitled DETECTION AND CORRECTION OF SKEW BETWEEN A REFERENCE AND LENTICULES IN LENTICULAR MATERIAL, filed Dec. 21, 1998, in the names of J. Cobb, A. Rivers, and J. Hawver.

FIELD OF THE INVENTION

The invention relates generally to the field of manufacturing lenticular images and more particularly to detecting and measuring the relative skew of a writing laser beam to lenticular material which is used for producing the lenticular images. More specifically, the invention relates to the detection and correction of any skew between the writing laser beam and the lenticules as the material is transported in a scanning laser printer.

BACKGROUND OF THE INVENTION

Lenticular images include an array of cylindrical lenses in a lenticular material and a sequence of spatially multiplexed images that are viewed through the lenticular material so that different ones of the multiplexed images are viewed at different angles by the viewer. One image effect produced by the lenticular image is a stereoscopic image, sometimes referred to as a depth image, where the lenticules are oriented vertically. One eye of a viewer sees one image of a stereo pair of images from one angle and the other eye of the viewer sees another image from the stereo pair of images. Another available image effect is a so called motion image, where different images in a sequence of images are viewed by both eyes, while the angle at which the image is viewed changes. In this image effect the lenticules are oriented in the horizontal direction and the lenticular material is rotated about the long axis of the lenticules. Other effects that combine these two effects, or form collages of unrelated images that can be viewed from different viewing angles can be provided.

It has been proposed to create stereoscopic images by providing a lenticular material having a color photographic emulsion thereon. The stereoscopic images are exposed onto the lenticular material by a laser scanner and the material is processed to produce the lenticular image product. See for example, U.S. Pat. No. 5,697,006, which issued Dec. 9, 1997 to Taguchi et al.

The image that is exposed on the lenticular material must be very precisely positioned under each lenticule. If the separate image lines produced by the writing laser beam of the laser scanner and the lenticules on the material are not aligned parallel, the resulting skew misalignment will degrade the image quality. There is a need therefore for an improved manufacturing process for making lenticular image products from lenticular material of the type having a lenticular lens array coated with photographic emulsion.

It is known to scan a non-actinic laser beam across a lenticular array in a direction perpendicular to the axes of the lenticules, and to sense the deflection of the beam by the lenticules to produce an output clock for modulating a writing laser beam. See U.S. Pat. No. 5,681,676, issued to Telfer et al. on Oct. 28, 1997.

Commonly assigned, co-pending U.S. patent application Ser. No. 09/217,030 entitled DETECTION AND CORRECTION OF SKEW BETWEEN A REFERENCE AND LENTICULES IN LENTICULAR MATERIAL, filed Dec. 21, 1998 in the names of Cobb et al. discloses a skew detection and correction process for forming a lenticular image product from a lenticular material having an array of cylindrical lenses. The lenticular material is scanned with a writing laser beam of light along a direction parallel to the long axes of the cylindrical lenses to form a latent lenticular image in photographic emulsion. A alignment beam of light having a wavelength outside of the range of sensitivity of the photographic emulsion is focused into a spot smaller than the pitch of the cylindrical lenses and onto the lenticular material. The lenticular material is moved through the beams to provide a page scan motion across the short axes of the lenticules of the material and to modulate the angle of reflection or refraction of the alignment beam of light caused by the lenticules. The position of the angularly-modulated alignment beam of light is sensed at two separated points along the long axes of a lenticule, and the sensed positions are used to control the rotational position of a pivoting cylinder mirror assembly. As a result, the skew between the writing laser beam and the long axes of the cylindrical lens is minimized and the parallel alignment of the writing laser beam to the lenticule is maintained.

Although the skew detection and correction process disclosed in the Cobb et al. application is believed to work well for its intended function, it cannot, however, determine if the skew error of the writing laser beam, relative to the media, is greater than a whole lenticule. For example, given a detector separation "w" of, say, 5 inches and a lenticule pitch "p" of, say, 0.015 inches, then the skew error "p/w" radians would be 0.17°. The Cobb et al. system would be unable to distinguish between this hypothetical condition and a perfectly aligned condition. In use, a skew alignment of this magnitude would result in a completely unacceptable print. Similarly, if the skew error were greater than half of this error (for example, a skew error of $\frac{1}{2}*p/w+\epsilon$, where $\epsilon$ is a small value), then the sensing system disclosed in the Cobb et al. application would predict an error of $-(\frac{1}{2}*p/w-\epsilon)$. This result would be wrong by an amount "p/w", or a single lenticule of skew error. Accordingly, while the system disclosed in the Cobb et al. application would provide a correct result in most situations, it will only be correct if the skew error is less than $\frac{1}{2}*p/w$. For errors greater than this angle, the detector system cannot determine the correct skew angle error.

DISCLOSURE OF THE INVENTION

It is an object of the present invention to provide a method and apparatus for detecting and/or measuring any variation of lenticular skew relative to the writing laser beam for the purpose of printing accurate images on the material.

It is another object of the invention to provide a method and apparatus for minimizing such variations during manufacture of a lenticular image product.

According to a feature of the present invention, a lenticular image printer creates an image on received media having a series of lenticules with parallel axes. The printer includes a transport system adapted to move received media in an in-track direction substantially perpendicular to the axes of the lenticules. An alignment beam generator is arranged to transmit an alignment beam through the lenticules of received media such that the alignment beam is in-track position-modulated by the lenticules. Three position-sensing detectors are aligned in a cross-track direction perpendicular to the in-track direction so as to receive the position-modulated alignment beam whereby the position of the position-modulated alignment beam on the detectors provides an indication of the relative alignment of the axes of the lenticules and the cross-track direction.

The invention, and its objects and advantages, will become more apparent in the detailed description of the preferred embodiments presented below.

ADVANTAGEOUS EFFECT OF THE INVENTION

The invention provides an accurate method for either mapping lenticular skew or detecting skew variations which can be compensated in a laser printer, thereby enabling efficient production of high quality lenticular image products using lenticular material having photographic emulsion coated thereon.

BRIEF DESCRIPTION OF THE DRAWINGS

In the detailed description of the preferred embodiments of the invention presented below, reference is made to the accompanying drawings, in which.

To facilitate understanding, identical reference numerals have been used, where possible, to designate identical elements that are common to the figures.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
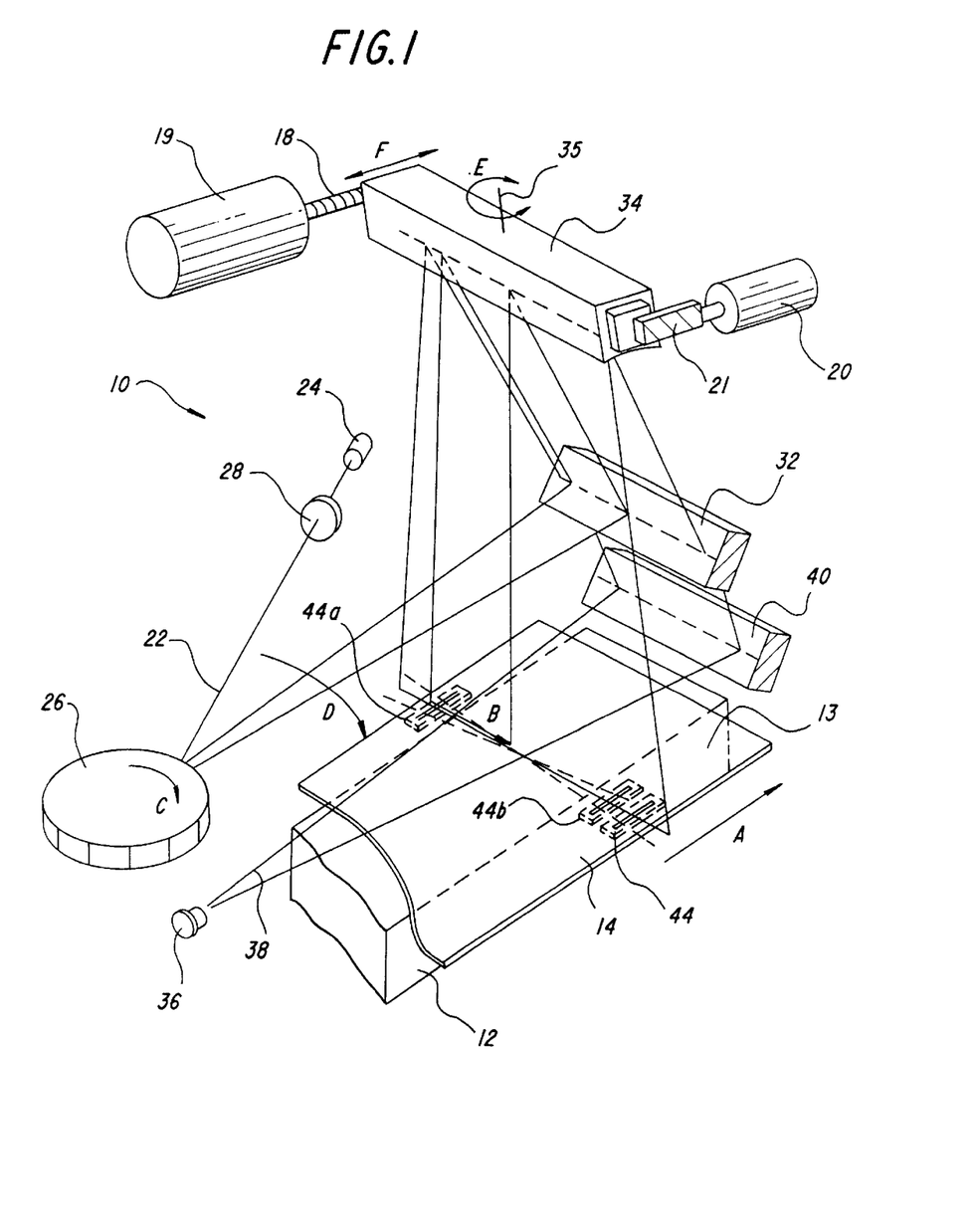
FIG. 1 is a schematic diagram of an apparatus employed to produce lenticular image products according to the present invention.

Referring to FIG. 1, lenticular image product production apparatus 10 includes a platen 12 for supporting a lenticular material 14. Lenticular material 14 is placed with the lenticules down on the top of platen 12 so that the emulsion side 13 of the lenticular material 14 faces up. Lenticular material 14 is made to overhang platen 12 on both sides, allowing fixed position sensing detectors 44, 44a, and 44b to be placed under the overhung edges of lenticular material 14. A suitable mounting structure (not shown) that fixedly mounts detectors 44, 44a, and 44b aligned in a cross-track direction while transport platen 12 and lenticular material 14 move.

Lenticular material 14 is transported by platen 12 in the in-track direction of arrow A by a linear transport system that is suitably driven, typically by a motor system (not shown) such as a direct drive linear motor or by a leadscrew. These drive systems are well understood and known in the art. Lenticular material 14 is exposed with a writing laser beam 22 from a modulated laser 24. Writing laser beam 22 is focused onto a scanning polygon 26 by optics 28. Scanning polygon 26 rotates in direction C, causing a reflection of writing laser beam 22 to scan in a direction D. Writing laser beam 22 is reflected from a cold mirror 32 onto pivotable cylinder mirror 34. Cold mirrors reflect visible light and transmits infra red light. Cylinder mirror 34 focuses the writing laser beam 22 onto emulsion side 13 of the lenticular material 14 thereby exposing the color photographic emulsion.

An infrared laser 36, located at a distance from the surface of the material identical to the distance to the scanning face of the polygon 26, generates an alignment beam of light 38, of a wavelength that can be transmitted through and which does not expose the lenticular material 14. The alignment beam of light is reflected by an IR turning mirror 40 through cold mirror 32 onto pivoting cylinder mirror 34. Cylinder mirror 34 focuses alignment beam 38 onto emulsion side 13 of lenticular material 14 in a line or two spots narrower than the width of a lenticule. Fixed detectors 44, 44a, and 44b are sensitive to the wavelength of alignment beam 38 and made insensitive to writing laser beam 22 by suitable filters placed over each detector during their manufacturing process. Alignment beam 38 passes through lenticular material 14 and is refracted by the lenticules of lenticular material 14 and impinge on fixed detectors 44, 44a, and 44b on either side of platen 12. Thus, the position of alignment beam 38 relative to the lenticules of lenticular material 14 is sensed by detectors 44, 44a, and 44b.

Cylinder mirror 34 is mounted so that it is rotatable about a pivot axis 35 in the direction arrow E at the center of the scan line of writing laser beam 22. Pivoting cylinder mirror 34 rotates both first and alignment laser beams 22 and 38 about pivot axis 35 and assures that the line of alignment beam 38 and the scan line of writing laser beam 22 are maintained parallel. Scanning polygon 26 works in conjunction with pivoting cylinder mirror 34 to cause writing laser beam 22 to scan the lenticular material in the direction of arrow B, parallel to the long cylindrical axes of the lenticules of lenticular material 14. The motion of lenticular material 14 caused by platen 12 in the direction of arrow A provides scanning in the cross-track direction.

Further, the angular position of pivoting mirror 34 is measured by position sensor 20, which has a moving member 21 fixedly mounted to an end portion of pivoting mirror 34. This sensor may be of any suitable type of position sensor known and employed in the art such as an LVDT, capacitive probe or potentiometer. A means for displacing or rotating the pivoting mirror 34 is attached at the other end of pivoting mirror 34. In the illustrated embodiment, a D.C. motor 19 and leadscrew 18 are employed to produced a controlled displacement of the end portion of pivoting mirror 34 in the direction of arrow F, and thus an angular displacement E about pivot axis 35. It can be appreciated by those skilled in the art that any number of other suitable means may employed to produce the same displacement including but not limited to, a cam actuator, voice coil or mechanical link. Thus, by the above described means, pivoting mirror 34 can be accurately controlled to change the angle of writing laser beam 22 and alignment beam 38 with respect to the lenticules on lenticular material 14 and therefore minimize any skew misalignment between them.

Figure 2A:
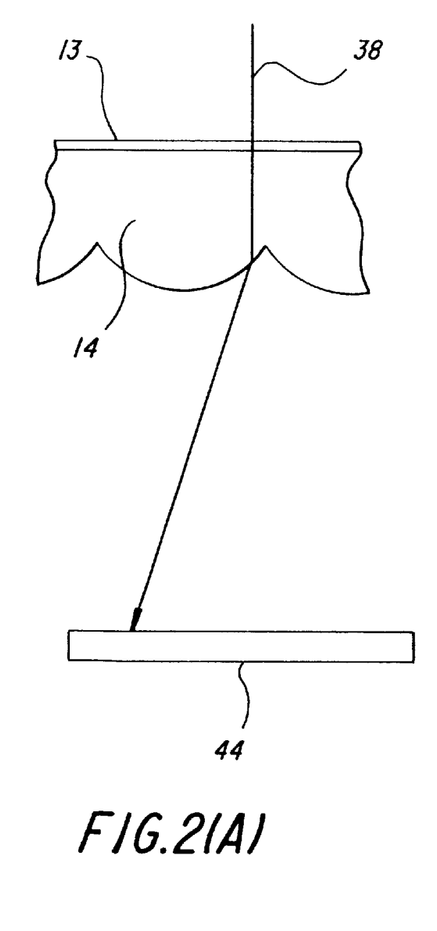
FIG. 2 is a schematic diagram illustrating the effect of the lenticular medium on the alignment beam of light.
Figure 2B:
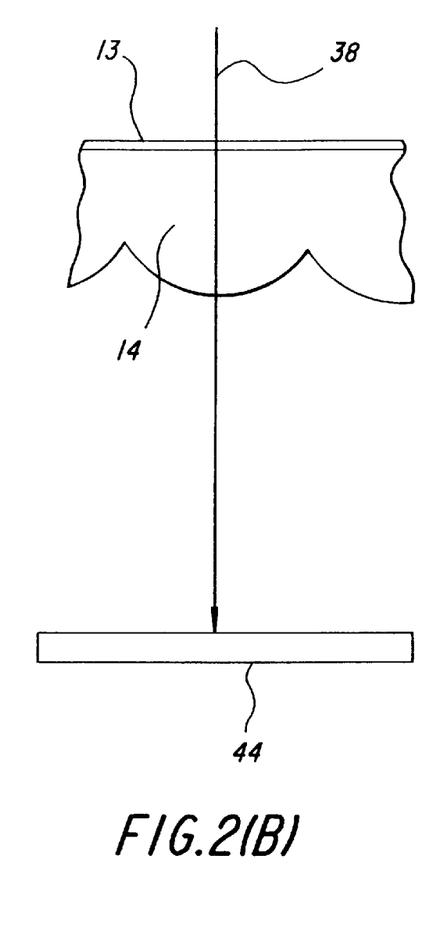
Figure 2C:
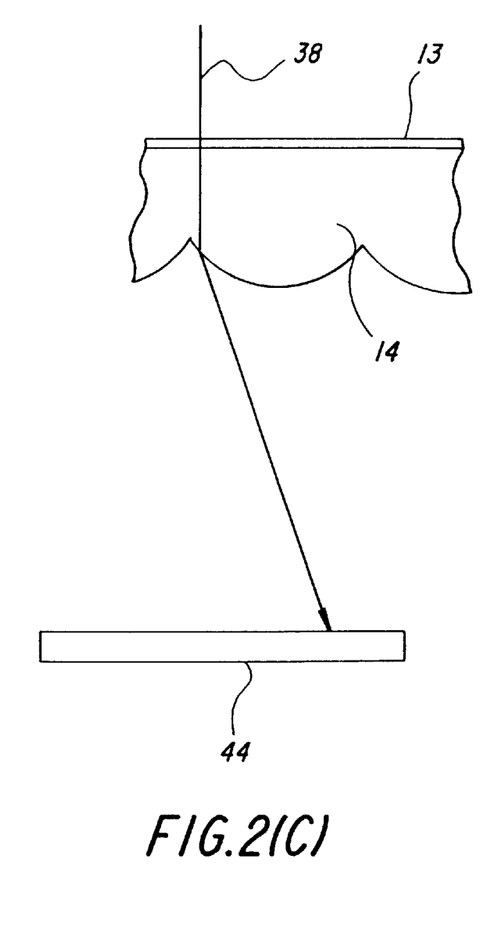

Turning now to FIG. 2, illustrating how the lenticular material deflects alignment beam 38 of infra red light as it passes through different portions of one of the lenticular lenses in lenticular material 14. Alignment beam 38 is focused onto and is transmitted through emulsion side 13 composed of a color photographic emulsion. As alignment beam 38 first encounters a lenticule, as shown in the illustration (A) on the left of FIG. 2, it is refracted at a large angle to the left and impinges on the left side of the position sensing detector 44 (or 44a or 44b). The angle depends upon the position of the lenticule with respect to alignment beam 38. When the alignment beam is at the center of a lenticule, as shown in the illustration (B), it is minimally deflected as shown in the illustration in the center and falls on the center of the position detector 44. As the lenticular material is moved further to the right, as shown in the illustration (C) on the right, the alignment beam is deflected to the right and impinges on the right side of position detector 44. Position detector 44 may be, for example, a PSD S3932 position sensitive detector available from Hamamatsu Photonics KK, Hamamatsu, Japan. However, any suitable photosensor means may be employed to detect the position of alignment beam 38, including: split cell detectors, CCD image sensors and any other photosensors capable of sensing a relative position change of a spot or line of light.

Figure 3:
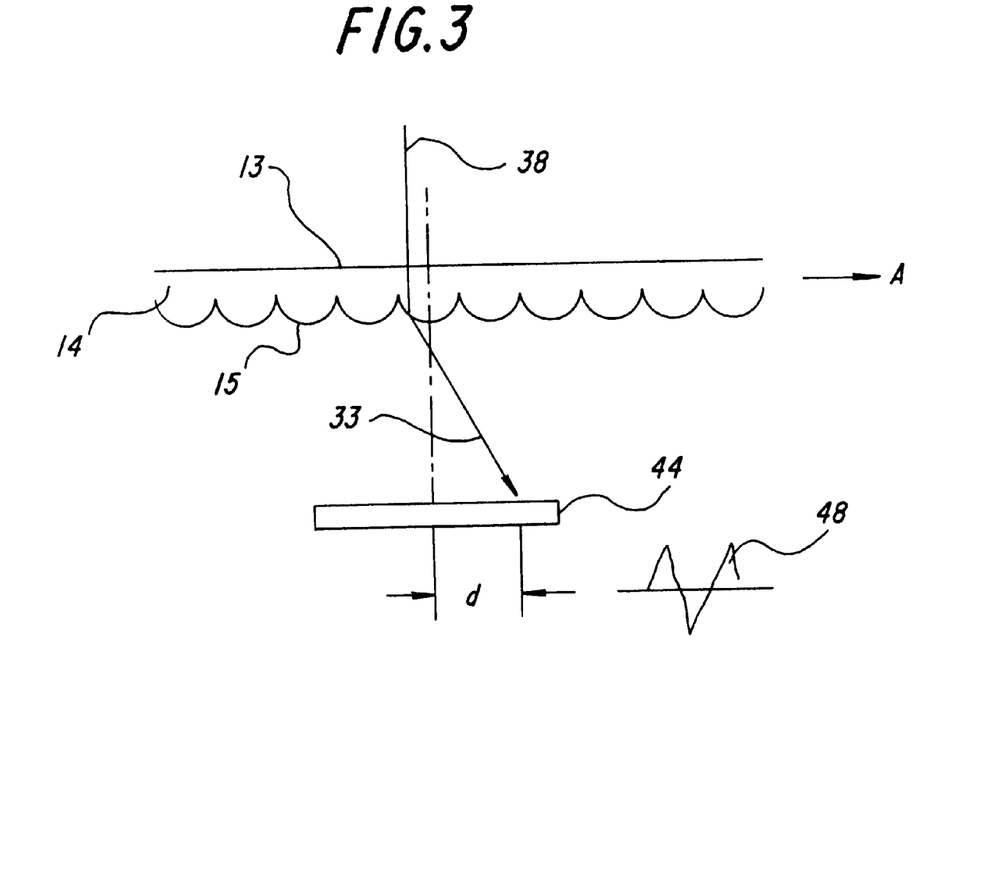
FIG. 3 shows details of the functionality of a position sensing detector.

Turning now to FIG. 3, there is shown further details of the functionality of position sensing detector 44 (or 44a or 44b). Alignment beam of light 38 is focused onto emulsion side 13 of lenticular material 14. Lenticular material 14 is moved relative to alignment beam 38 in the in-track direction by the transport mechanism (not shown) in direction A. When alignment beam 38 passes through a curved surface 15 of the lenticular material 14, it refracts at a large angle. The centroid of the exiting beam 33 is axially displaced from original alignment beam 38 by a distance "d". This distance "d" is measured by position sensing detectors 44, 44a, and 44b. As the transport mechanism moves lenticular material 14, the distance "d" changes. An output signal 48 is generated as the centroid of exiting beam 33 is axially displaced from original alignment beam 38 by distance "d". Waveform 48 produced by position detectors 44, 44a, and 44b is shown in FIG. 3.

Figure 4:
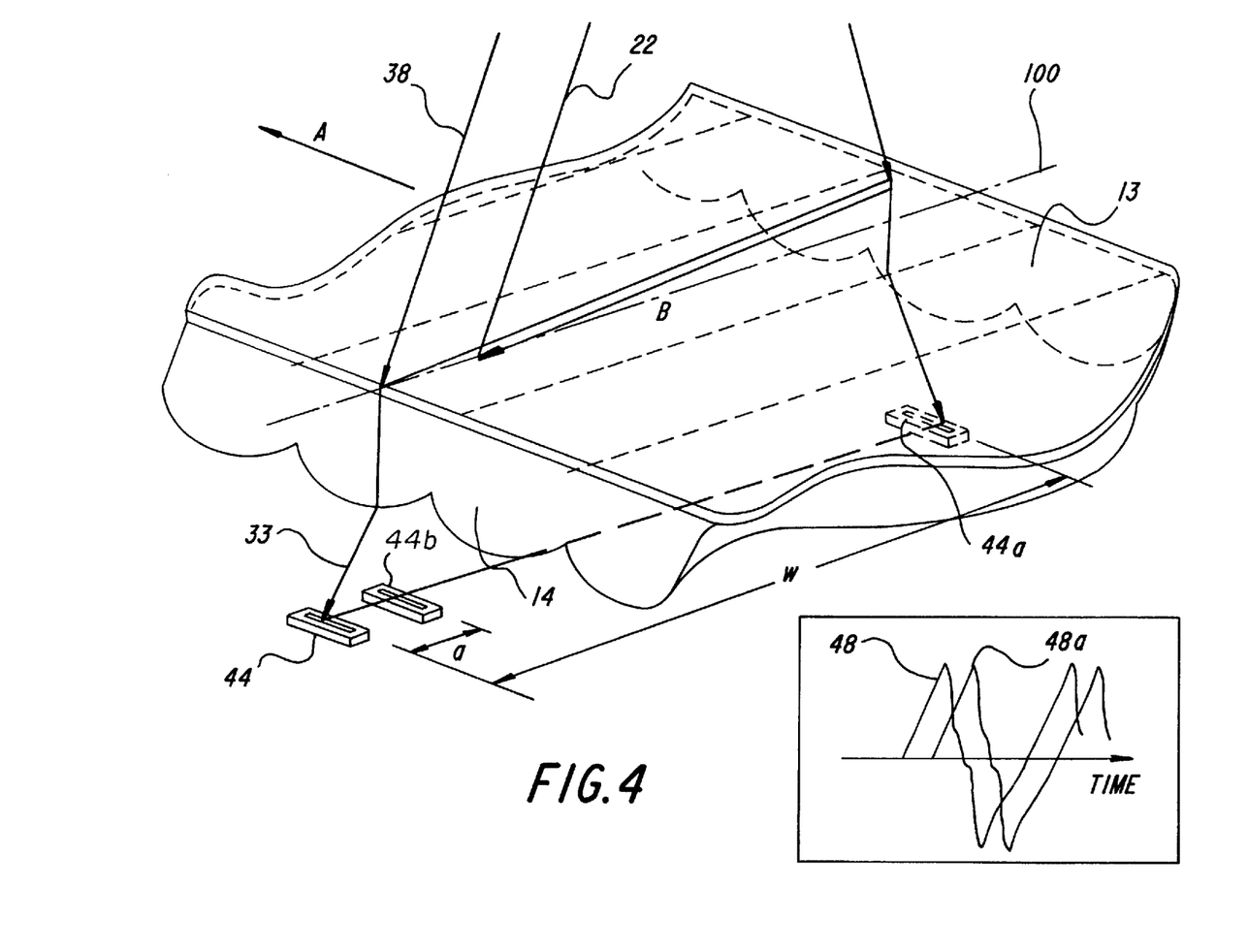
FIG. 4 shows the skew misalignment of a writing laser beam and a alignment beam with respect to the lenticules and the refracted alignment beam as it impinges onto detectors.

Referring now to FIG. 4, where the skew misalignment of writing laser beam 22 and alignment beam 38 with respect to the lenticules is shown. Position sensing detectors 44, 44a, and 44b are shown in the correct orientation for detecting this skew misalignment. As the lenticular material 14 is transported in in-track direction A, alignment beam 38 is transmitted through the lenses of the lenticules and refracted, resulting in the generation of an output signals 48 by each detector 44, 44a, and 44b. If alignment beam 38 is misaligned relative to the long axis of lenticule 100, the position of refracted beam 33 will be different at each detector. Waveforms 48 from each detector will be positionally out of phase. The resulting relative phase position between waveforms 48 will vary as a function of different amounts of skew misalignment between alignment beam 38 and long axis 100 of the lenticule lens onto which it is directed as illustrated by waveforms 48 and 48a in FIG. 4.

Still referring to FIG. 4, the present invention provides a third (or third and fourth in the case of another embodiment) detector 44b to the disclosure of affore-mentioned U.S. patent application Ser. No. 09/217,030, which has but two detectors corresponding to detectors 44 and 44a. Third detector 44b is located in a straight line with two detectors 44 and 44a of the earlier application, is between those two detectors, and is closer to one of those two detectors (this spacing is labeled as distance "a").

For the three detector system, a "fine angle error" $E_f$ is calculated from the center-crossing data of the two outboard detectors as follows:

$$E_f = (D_f * V)/w$$

where, $E_f$ is the fine angle error in radians;

$D_f$ is the phase difference (in seconds) between the zero crossings of two outboard detectors;

w is the spacing between the two outboard detectors; and

V is the transport (media) velocity.

The zero crossing point of the waveform of each detector is determined, and the phase of the zero crossing point of the waveform of third detector 44b is now compared directly to the phase of the adjacent detector 44 to determine any difference in phase. This phase difference, $D_p$, is used to calculate a "coarse angle error" $E_c$, as follows:

$$E_c = (D_p * V)/a$$

where, $E_c$ is the coarse angle error in radians;

$D_p$ is the phase difference (in seconds) between the zero crossings of third detector 44b and its adjacent outboard detector 44;

a is the spacing between third detector 44b and its adjacent outboard detector 44; and V is the transport (media) velocity.

Although this calculated value $E_c$ represents the actual skew error, the accuracy of this measurement is not adequate, by itself to calculate the skew error to the precision required for the active alignment of the beam. This coarse error measurement, $E_c$, is combined with the fine error measurement, $E_f$ as follows:

$$n = \text{Integer}\{(E_c - E_f)/(p/w)\}$$

where "p" is the lenticule pitch. This equation is solved for integer "n", where n represents the number of integer lenticule errors in the measurement of detector 44. The true angle error is now calculated:

$$E = n * p/w + E_f$$

Note that $E_c$ is used solely to determine the number of integer lenticule errors in detector 44 reading. This allows for the reduced accuracy of $E_c$ without affecting the final calculated error as long as the error in $E_c$ is less than p/w.

The current invention, as explained above, provides a third detector 44b, which is close to one of the existing detectors 44 and 44a, and in line with both of the existing detectors. The data from detector 44b is processed similarly to that from detectors 44 and 44a. If the spacing between detectors 44 and 44a is "w" and the spacing between the third detector and its adjacent detector is "a", the system can determine any skew error in the range of +/−½*p/a. In practice, dimension "a" may be in the range of 0.25 inches, compared to "w" of 5 inches, so that the range of this improved detector system would be +/−1.7° compared to the existing system useful range of 0.09°. In this example, the reliable sensing range has been increased by a factor of twenty. For an automated printer, this increase range would improve the machine robustness and decrease waste.

Thus, the system as described, is capable of generating electrical signals which represent, by their phase difference, the degree of angular skew alignment between alignment beam 38 and long axis 100 of the lenticular material 14. Initial pre-alignment of detectors 44, 44a, and 44b are required in order to assure that the generated electrical signals have the desired phase difference when alignment beam 38 and long axis 100 are parallel aligned. This is accomplished by removal of lenticular material 14 to ensure that alignment beam 38 is undeflected by the lenticules of lenticular material 14 and moving either detector relative to the other, in the direction of arrow A, to produce the desired output voltage equivalent to waveforms desired phase difference.

Figure 5:
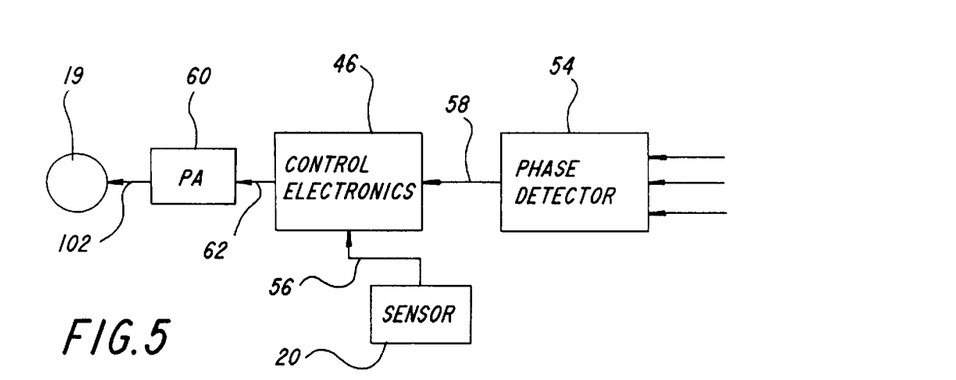
FIG. 5 is a schematic diagram illustrating the apparatus for processing output signals of the detectors to generate a correction signal for controlling the position of a pivoting cylinder mirror.

FIG. 5 shows control electronics for the present invention. Output signals 48, 48a, and 48b from position sensing detectors 44, 44a, and 44b are input to the phase detection means 54. Phase detection means 54 can be of any of the known phase detection means understood and known in the art. A typical method might measure the time difference between the zero crossings of waveforms 48 of each detector 44, 44a, and 44b and convert this to a voltage using a charge pump technique. The resultant phase difference signal 58 is input to the control electronics 46. The output 58 of the phase detection means 54 represents the degree of skew between the lenticular long axis 100 and, the writing laser beam 22 and alignment beam 38. The control electronics generates a control signal 62 which is directed to power amplifier 60 to generate a drive signal 102 to drive the pivoting cylinder mirror motor 19. The control electronics 46 also receives a position feedback signal 56 from the pivoting cylinder mirror position sensor 20 that monitors the angular position of the pivoting cylinder mirror 34. This position feedback signal 56 is used by the control electronics 46 to enhance the stability of the servo system.

Figure 6A:
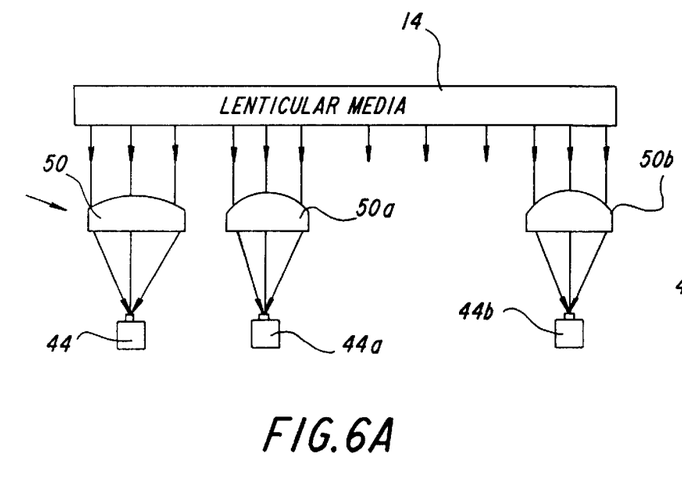
FIGS. 6A and 6B are side views of apparatus according to another embodiment of the present invention.
Figure 6B:
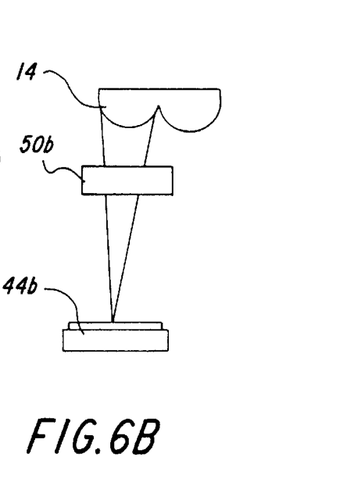

Referring to FIGS. 6A and 6B, cylindrical lenses 50, 50a, and 50b may be located above detectors 44, 44a, and 44b, respectively, with power orthogonal to that of the lenticular material 14. The lenses collect the light which is fanned in a line and place it on each of the detectors, as shown in the drawing. This increases the signal onto the detector, providing a higher signal to noise ratio. Additionally, the technique would eliminate some sensitivity to defects in the lenticules and/or to contamination on the media directly over the detector by averaging the signal over a larger region of the lenticular material. Centration of the lenses over the detectors would be important, as the spatial separation of the lenses would impact the calculated position.

Figure 7A:
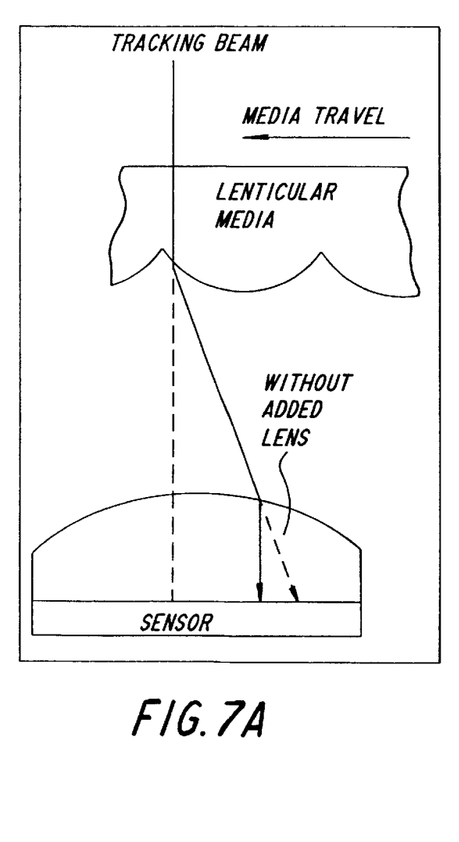
FIGS. 7A–7C are side views of apparatus according to still another embodiment of the present invention.
Figure 7B:
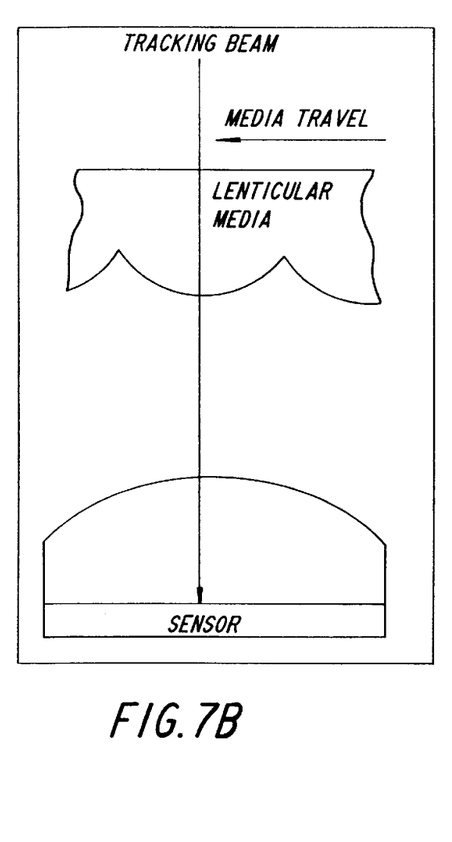
Figure 7C:
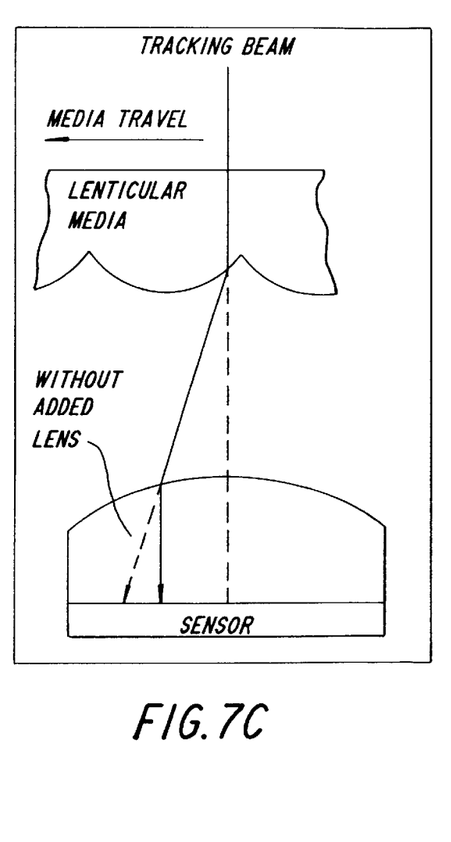

Referring to FIGS. 7A–7C, placing a lens 52, 52a, and 52b with power parallel to the lenticular direction centered over each of detectors 44, 44a, and 44b, respectively, will change the sensitivity/range of the detection method. Additional lens power will make the alignment beam motion on detectors 44, 44a, and 44b larger, thereby increasing sensitivity. Using negative power will decrease alignment beam motion on detectors 44, 44a, and 44b, thereby decreasing sensitivity. If a particular position sensing detector is utilized this would also change the range of motion detected.

Figure 8:
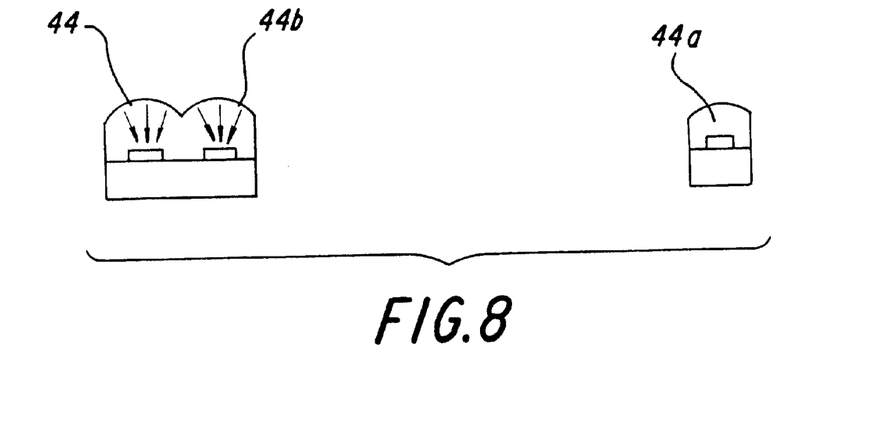
FIG. 8 is a side view of apparatus according to another embodiment of the present invention.

FIG. 8 shows detector 44b fabricated directly onto the same piece of substrate as detector 44, providing separation accuracy. Bi-cylinder lenses are molded directly on top of the detectors to enhance light gathering, signal average, and adjust the sensitivity and range of the system.

An alternate configuration is to add two detectors, each close to one of the existing detectors. This improvement results in increased robustness and allows for operation of the system in the event of the loss of function of one of the detectors. The four detector configuration can also be used to improve the accuracy of the system by averaging data from all four detectors. This can effectively reduce the effects of detector noise.

The improved sensing system according to the present invention will result in accurate skew error angle measurement over a much larger range of errors. This would result in a more robust machine, which would both be able to correct larger errors in alignment or inherent accuracy in the lenticular media, and be used to reject media which was loaded in such a way the alignment errors were large. This would result in cost savings due to; reduced accuracy requirements on media, increased useful throughput, and reduced loss.

The invention has been described in detail with particular reference to preferred embodiments thereof, but it will be understood that variations and modifications can be effected within the spirit and scope of the invention.

What is claimed is:

1. A lenticular image printer for creating an image on received media having a series of lenticules with parallel axes; said printer comprising:

a transport system adapted to move received media in an in-track direction substantially perpendicular to the axes of the lenticules;

an alignment beam generator arranged to transmit an alignment beam through the lenticules of received media such that the alignment beam is in-track position-modulated by the lenticules; and three position-sensing detectors aligned in a cross-track direction perpendicular to the in-track direction so as to receive the position-modulated alignment beam whereby a position of the position-modulated alignment beam on the detectors provides an indication of relative alignment of the axes of the lenticules and the cross-track direction, said position-sensing detectors being aligned such that there are two outboard detectors and a third detector between the two outbound detectors wherein:

the lenticules have a pitch;

the outboard detectors are spaced apart by a spacing there between; and the indication of the relative alignment of the axes of the lenticules and the cross-track direction is a true angle error signal E determined by an equation $E = n * p/w + E_f$, where:

p is the lenticule pitch;
w is the spacing between the two outboard detectors;
$E_f$ is a fine angle error in radians determined by an equation $E_f = (D_f * V)/w$, where $D_f$ is a phase difference in seconds between zero crossings of two outboard detectors, and
V is a transport (media) velocity; and
n is a number of integer lenticule errors determined by an equation $n = \text{Integer}\{(E_c - E_f)/(p/w)\}$, where $E_c$ is a coarse angle error in radians determined by an equation $E_c = (D_p * V)/a$, where $D_p$ is a phase difference (in seconds) between zero crossings of the third detector and its adjacent outboard detector and a is a spacing between third detector and its adjacent outboard detector.

2. A lenticular image printer as set forth in claim 1 further comprising a printing beam generator adapted to optically expose received media along the in-track direction.

3. A lenticular image printer as set forth in claim 1 further comprising a calculating means for determining the relative alignment of the axes of the lenticules and the cross-track direction.

4. A lenticular image printer as set forth in claim 1 further comprising alignment means for correcting the relative alignment of the axes of the lenticules and the cross-track direction.

5. A lenticular image printer as set forth in claim 1 further comprising control electronics, responsive to the indication of the relative alignment of the axes of the lenticules and the cross-track direction to generate a signal to correct for any misalignment of the axes of the lenticules and the cross-track direction.

6. A lenticular image printer for creating an image on received media having a series of lenticules with parallel axes; said printer comprising:
   a transport system adapted to move received media in an in-track direction substantially perpendicular to the axes of the lenticules;
   an alignment beam generator arranged to transmit an alignment beam through the lenticules of received media such that the alignment beam is in-track position-modulated by the lenticules;
   three position-sensing detectors aligned in a cross-track direction perpendicular to the in-track direction so as to receive the position-modulated alignment beam whereby a position of the position-modulated alignment beam on the detectors provides an indication of relative alignment of the axes of the lenticules and the cross-track direction, said position-sensing detectors being aligned such that there are two outboard detectors and a third detector between the two outbound detectors; and
   intermediate optics between the media and the detectors, said optics having power orthogonal to that of the lenticules.

7. A lenticular image printer as set forth in claim 6 wherein the intermediate optics is a plurality of cylinder lens parallel to the lenticules.

8. A lenticular image printer as set forth in claim 7 wherein the intermediate optics is spaced from the detectors.

9. A lenticular image printer as set forth in claim 7 wherein the intermediate optics is in contact with the detectors.

10. A lenticular image printer as set forth in claim 7 wherein the third detector and one of the outboard detectors are formed on a single silicon substrate.

11. A method of detecting relative skew between a reference beam and transparent lenticular material of the type having a repeating pattern of cylindrical lenses with long axes; said method comprising the steps of:
   focusing a beam of light onto at least three axial positions along the long axis of a cylindrical lens of the lenticular material;
   moving the lenticular material relative to the beam in an in-track direction such that the beam crosses the long axes of the cylindrical lenses to modulate the position of the beam of light as it passes through the lenses;
   sensing a position of the modulated beam of light at three or more cross-track positions to determine the skew or relative angular location of lenticular material to the cross-track direction of movement of the material;
   directing the beam of light onto the lenticular material via a pivoting mirror;
   rotating the pivoting mirror;
   detecting a rotational position of the pivoting mirror;
   converting the sensed skew or relative angular location between the beam and the long axis of the cylindrical lenses of the lenticular material to a correction signal;
   generating a commanded position signal; and
   providing the commanded position signal as an input to a position control system to minimize the skew between the beam and the longitudinal axis of the cylindrical lenses of the lenticular material by rotating the pivoting mirror.

12. Apparatus for detecting the relative skew between a reference beam and transparent lenticular material of the type having a repeating pattern of cylindrical lenses with long axes; said apparatus comprising:
   means for focusing a beam of light onto at least three axial positions along the long axis of a cylindrical lens of the lenticular material;
   means for moving the lenticular material relative to the beam in an in-track direction such that the beam crosses the long axes of the cylindrical lenses to modulate the position of the beam of light as it passes through the lenses;
   means for sensing the position of the modulated beam of light at three or more cross-track positions to determine the skew or relative angular location of lenticular material to the cross-track direction of movement of the material;
   means for directing the beam of light onto the lenticular material via a pivoting mirror;
   means for rotating the pivoting mirror;
   means for detecting a rotational position of the pivoting mirror;
   means for converting the sensed skew or relative angular location between the beam and the long axis of the cylindrical lenses of the lenticular material to a correction signal;
   means for generating a commanded position signal; and
   means for providing the commanded position signal as an input to a position control system to minimize the skew between the beam and the longitudinal axis of the cylindrical lenses of the lenticular material by rotating the pivoting mirror.

* * * * *